US005446568A

United States Patent [19]

Nakazawa et al.

[11] Patent Number: 5,446,568

[45] Date of Patent: Aug. 29, 1995

[54] ACTIVE MATRIX DISPLAY APPARATUS WITH PLURAL SIGNAL INPUT CONNECTIONS TO THE SUPPLEMENTAL CAPACITOR LINE

[75] Inventors: Kiyoshi Nakazawa, Fujiidera; Mikio Katayama, Ikoma; Hiroaki Kato; Akihiko Imaya, both of Nara, all of Japan

[73] Assignee: Sharp Kabushiki Kaisha, Osaka, Japan

[21] Appl. No.: 908,749

[22] Filed: Jul. 6, 1992

Related U.S. Application Data

[63] Continuation of Ser. No. 558,871, Jul. 30, 1990, abandoned.

[30] Foreign Application Priority Data

Aug. 3, 1989 [JP] Japan .................................. 1-201973

[51] Int. Cl.[6] ............................................ G02F 1/343

[52] U.S. Cl. ........................................................ 359/59

[58] Field of Search .................. 350/333, 336; 357/45, 357/68; 359/87, 88, 59

[56] References Cited

U.S. PATENT DOCUMENTS

| | | | |
|---|---|---|---|
| 4,499,484 | 2/1985 | Tanizawa et al. | 357/68 |
| 4,811,073 | 3/1989 | Katamura et al. | 357/45 |
| 4,906,072 | 3/1990 | Kaneko et al. | 350/333 |
| 4,914,503 | 4/1990 | Shirato et al. | 357/71 |
| 4,952,997 | 8/1990 | Sugiyama et al. | 357/40 |
| 5,076,667 | 12/1991 | Stewart et al. | 359/87 X |

FOREIGN PATENT DOCUMENTS

| | | |
|---|---|---|
| 0216188 | 4/1987 | European Pat. Off. . |
| 2173628 | 10/1986 | United Kingdom . |

*Primary Examiner*—William L. Sikes
*Assistant Examiner*—Ron Trice
*Attorney, Agent, or Firm*—Nixon & Vanderhye

[57] ABSTRACT

An active matrix display apparatus comprising pixel electrodes arranged in a matrix fashion on an insulating substrate, storage capacity electrodes arranged opposite to said pixel electrodes, storage capacity lines connected individually to said storage capacity electrodes, a common main line connected to said storage capacity lines, at least one branch line branched from said common main line, and a branch terminal formed at the leading end of said branch line, whereby a signal delay can be minimized.

6 Claims, 3 Drawing Sheets

FIG. 4
PRIOR ART
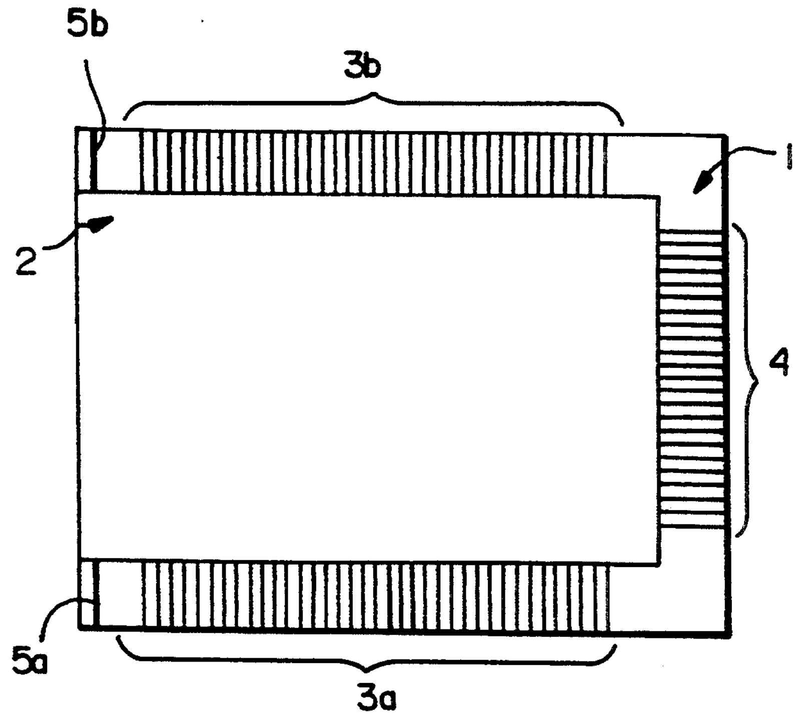
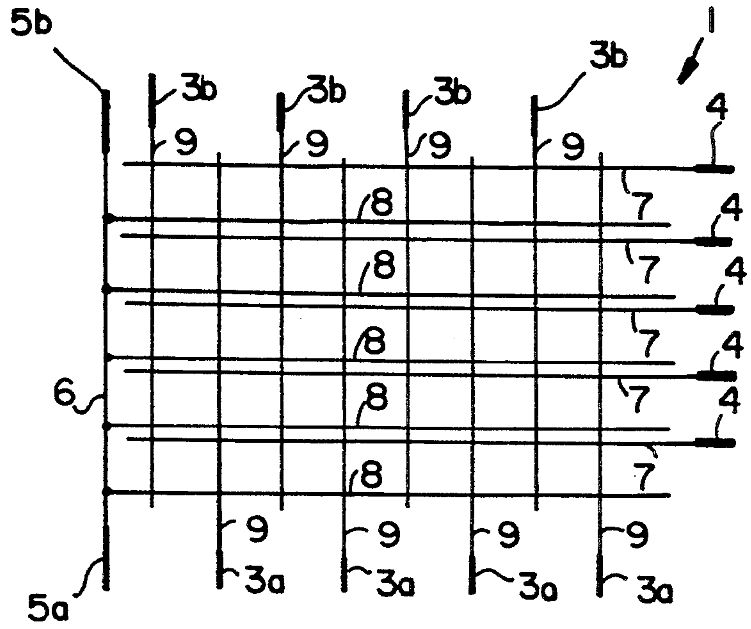
FIG. 5
PRIOR ART

ACTIVE MATRIX DISPLAY APPARATUS WITH PLURAL SIGNAL INPUT CONNECTIONS TO THE SUPPLEMENTAL CAPACITOR LINE

This is a continuation of application Ser. No. 07/558,871, filed Jul. 30, 1990, now abandoned.

BACKGROUND OF THE INVENTION

1. Field of the Invention

This invention relates to an active matrix display apparatus having a storage capacity.

2. Description of the Prior Art

An active matrix system of the type having pixel electrodes arranged in a matrix fashion on an insulating substrate so that the pixel electrodes are independently driven has been employed in display apparatuses using liquid crystals. Such an active matrix system has often been employed especially in large-sized display apparatuses geared for high-density display.

Thin film transistor (TFT) apparatuses, MOS transistor devices, MIM (metal - insulator - metal) devices, diodes, varistors, and the like have been used as switching devices for selectively driving the pixel electrodes. An active matrix drive system affords high contrast display and indeed it has been put into practical use in various areas of application, including liquid crystal television, word processors, and terminal display units for computers.

FIG. 4 shows a plan view of a conventional active matrix display apparatus, which includes an active matrix board 1 and a counter substrate 2 placed upon the board 1. In this display apparatus, TFTs are used as switching devices. A display medium, such as a liquid crystal, is contained in the space between the active matrix board 1 and the counter substrate 2 to thereby form the display apparatus.

FIG. 5 schematically illustrates the active matrix board 1 shown in FIG. 4. The active matrix board 1 comprises gate bus lines 7, source bus lines 9, intersecting the gate bus lines 7, and storage capacitance lines (i.e., addition capacitance lines) 8 arranged in a parallel relation to the gate bus lines 7. All the storage capacitance lines 8 are connected to a common main line 6 for storage capacitances. As shown in FIG. 4, in portions of the active matrix board 1 which are not covered by the counter substrate 2 placed on the board 1 there are arranged source signal terminals 3*a*, 3*b*, gate signal terminals 4, and common line terminals 5*a*, 5*b* connected to the common main line 6.

FIG. 2 is a schematic diagram showing a rectangular area surrounded by source bus lines 9, a gate bus line 7 and a storage capacitance line 8 as are shown in FIG. 5. A gate electrode 21 of a TFT 10 is connected to the gate bus line 7, and a source electrode 22 of the TFT 10 is connected to one of the source bus lines 9. A drain electrode 23 is connected to a pixel electrode 11. A storage capacitance 12 is formed between a storage capacitance electrode (i.e., an addition capacitance electrode) 24 connected to the storage capacitance line 8 and the pixel electrode 11.

In this display apparatus, when an ON signal is applied to the gate bus line 7, the resistance of the TFT 10 is lowered and a data signal output to the one source bus line 9 is written to the pixel electrode 11. Upon completion of writing of the data, an OFF signal is applied to the gate bus line 7 and the resistance of the TFT 10 becomes higher. The data signal written is held by the storage capacitance 12 between the pixel electrode 11 and the storage capacitance electrode 24 and also by a pixel capacitance between the pixel electrode 11 and a counter electrode (not shown) on the counter substrate 2. The data signal is retained in place until the next writing takes place.

Each gate bus line 7, each source bus line 9, and each storage capacitance line 8 are made of metal or other conductive materials and respectively have electric resistances R (G), R (S), and R (Cs). These lines 7, 9 and 8 respectively have capacitances C (G), C (S), and C (Cs) formed between the individual lines 7, 9 and 8 as one part and other individual intersecting lines and counter electrodes as the other part. Therefore, on the respective lines 7, 9 and 8 there will occur signal delays corresponding to time constants $\tau$ (G), $\tau$ (S), $\tau$ (Cs) represented by products of the respective resistances and the respective capacitances. Because of such signal delay, a signal applied to the terminal of each respective line will delay as it advances toward the leading end of the line.

The magnitude of such a signal delay depends upon time constants $\tau$ (G) and $\tau$ (S) on the gate bus line 7 and source bus line 9 respectively, where a signal delay on the storage capacitance line 8 depends on the value of $\tau$ (Cs) added by $\tau$ ($Cs_0$) on the common main line 6. Since all storage capacitance lines 8 are connected to the common main line 6, the value of $\tau$ ($Cs_0$) is an enormous one. Therefore, a signal applied to common line terminals 5*a* and 5*b* will delay on the common main line 6 and further delay on the storage capacitance line 8.

In the active matrix board shown in FIG. 5, a signal delay on the common main line 6 is greatest at a central part of the line 6 which is most remote from the common line terminals 5*a* and 5*b*. A signal delay on the storage capacitance line 8 is largest at a portion of the line 8 which is most remote from the common main line 6. In the example shown in FIG. 5, therefore, a signal delay is largest at a central portion of the board at the right end thereof. Data signals cannot always satisfactorily be written to the pixel electrode 11 connected to the portion of the storage capacitance line 8 at which a large signal delay occurs while an ON signal is being applied to the gate bus line 7. Thus, a display irregularity due to the signal delay may occur on the display.

As the display screen becomes larger, line resistance and line capacitance become greater and accordingly the above-mentioned problems will more conspicuously occur. Similarly, as the display screen becomes more refined, a greater number of lines are involved and accordingly such problems will become more conspicuous.

For instance, a trial calculation can be made with respect to a liquid crystal display apparatus having a diagonal of the order of 14 inches. Assuming that the material of the common main line 6 is Ti metal (with a specific resistance of $10^{-4}$ Ω. cm) and that the line 6 is 4000 Å in thickness, 2 mm in width, and 200 mm in length, the resistance over the entire length of the common main line 6 is about 250 $\phi$. Since the capacitance of the common main line 6 is more than 0.2$\mu$ F, the time constant at the center portion of the common main line 6 at which the signal delay is greatest is more than 12.5$\mu$ sec. In a display apparatus in which 480 bus lines are subjected to non-interlace scanning, the required write time for a data signal is about 30$\mu$ sec. It can be understood from this that the above-mentioned time constant value is unacceptably large. Therefore, the display apparatus is subject to considerable display irregularities.

SUMMARY OF THE INVENTION

The active matrix display apparatus of this invention, which overcomes the above-discussed and numerous other disadvantages and deficiencies of the prior art, comprises an active matrix display apparatus comprising pixel electrodes arranged in a matrix fashion on an insulating substrate, storage capacitance electrodes arranged opposite to said pixel electrodes, storage capacitance lines connected individually to said storage capacitance electrodes, a common main line connected to said storage capacitance lines, at least one branch line branched from said common main line, and a branch terminal formed at the leading end of said branch line.

In one embodiment, the common main line is connected to one end of said storage capacitance line.

In one embodiment, the common main lines are connected to respective opposite ends of said storage capacitance lines.

Thus, the invention described herein makes possible the objectives of (1) providing an active matrix display apparatus having storage capacitance lines which are less likely to involve a signal delay; and (2) providing an active matrix display apparatus that has a branch line branched from a common main line, and a branch terminal formed at the leading end of the branch line, and accordingly a signal delay if any, can be minimized on the storage capacitance lines, whereby the display apparatus of the invention provides a higher level of image quality and is capable of meeting the requirements for larger size construction and a higher degree of sophistication for such a display apparatus.

BRIEF DESCRIPTION OF THE DRAWINGS

This invention may be better understood and its numerous objects and advantages will become apparent to those skilled in the art by reference to the accompanying drawings as follows:

FIG. 4 is a plan view showing a conventional active matrix display apparatus.

FIG. 5 is a schematic diagram showing an active matrix board employed in the display apparatus of FIG. 4.

DESCRIPTION OF THE PREFERRED EMBODIMENTS

The active matrix display apparatus of this invention has, in addition to common line terminals at both ends of a common main line, a branch terminal provided at the leading end of a branch line branched from the common main line. The branch terminal functions as a signal input in the same manner as the common line terminals, and accordingly the common main line is divided at the point at which the branch line is branched from the common main line. Therefore, the respective divisional portions of the common main line are reduced in resistance and capacitance and thus the problem of signal delay can be effectively solved.

For example, one branch line is provided at a median point of the common main line and a branch terminal is provided at the leading end of the branch line, whereby the common main line is equally divided into two parts. Accordingly, the resistance and capacitance of the common main line are halved between the respective half portions of the common main line so divided. Therefore, the time constant which represents a signal delay on the common main line is reduced to one quarter thereof. Similarly, where two branch lines are provided at two points at which the common main line is divided into three parts, and branch terminals are provided at the respective leading ends of the branch lines, the time constant on the common main line is reduced to one ninth. By increasing the number of branch lines in this way, it is possible to significantly reduce a possible signal delay.

EXAMPLE 1

Figure 1:
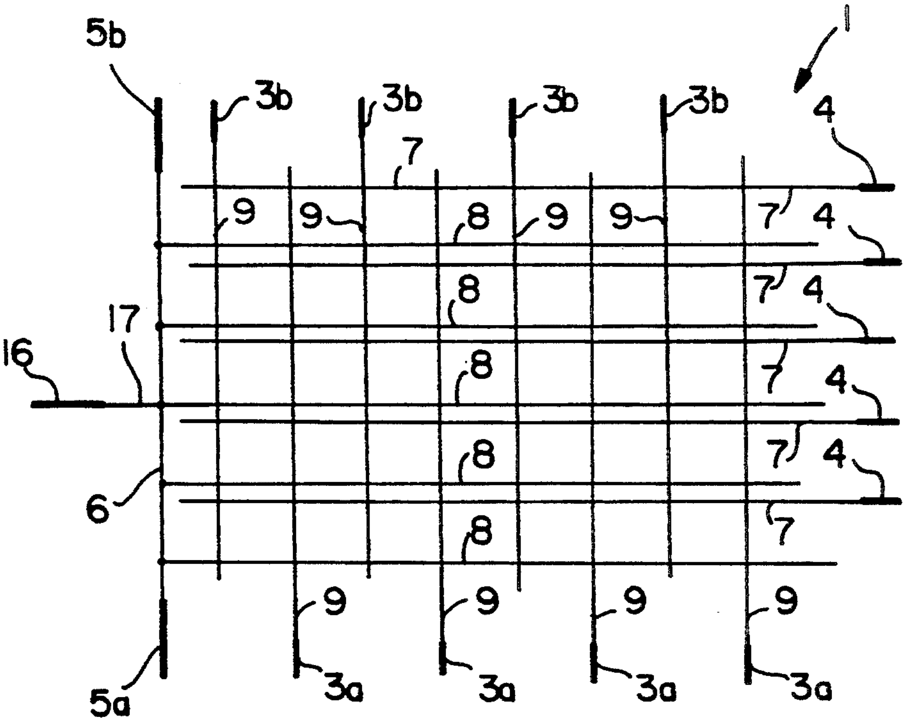
FIG. 1 is a schematic diagram showing an active matrix board of a display apparatus of this invention.

FIG. 1 is a schematic diagram showing one example of an active matrix board 1 employed in the display apparatus according to the invention. A fragmentary enlarged view of the board in FIG. 1 is such as that shown in FIG. 2. The active matrix display apparatus in this example comprises pixel electrodes 11 arranged in a matrix fashion on an insulating substrate, storage capacitance electrodes 24 arranged opposite to the pixel electrodes 11, storage capacitance lines 8 connected to the storage capacitance electrodes 24, a common main line 6 connected to the storage capacitance lines 8 at one end thereof, a branch line 17 branched from the common main line 6, and a branch terminal 16 formed at the leading end of the branch line 17. Gate bus lines 7 parallel to each other are arranged between the individual pixel electrodes 11, and source bus lines 9 are arranged in an intersecting relation with the gate bus lines 7. The gate bus lines 7 are parallel to the storage capacitance lines 8.

Figure 2:
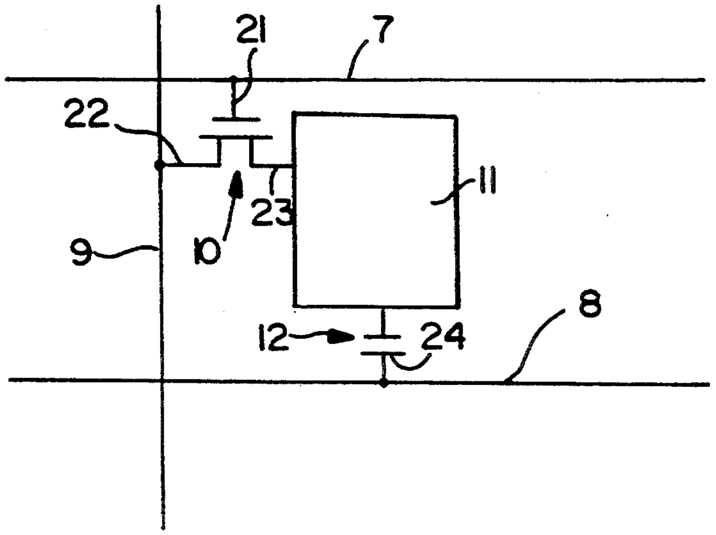
FIG. 2 PRIOR ART
FIG. 2 is a schematic diagram showing an enlarged portion of the active matrix board shown in FIGS. 1 and 5.

As shown in FIG. 2, a gate electrode 21 of a TFT 10 is connected to one gate bus line 7, and a source bus line 9. A drain electrode 23 of the TFT 10 is connected to one pixel electrode 11. A storage capacitance 12 is formed between the storage capacitance electrode 24 connected to the storage capacitance line 8 and the pixel electrode 11.

In the present example as shown in FIG. 1, source bus lines 9 each having a source signal terminal 3*a* on one side of the substrate 1 and source bus lines 9 each having a source signal terminal 3*b* on the other side of the substrate 1, are arranged in an alternate relation. A gate signal terminal 4 is provided at one end of each gate bus line 7.

The common main line 6 is provided on that side of the substrate 1 which is opposite to the side on which each gate signal terminal 4 is provided. The common main line 6 is connected to all the storage capacitance lines 8. Common line terminals 5*a* and 5*b* are provided respectively at opposite ends of the common main line 6. The branch line 17 is branched from a median point of the common main line 6. The branch terminal 16 is provided at the leading end of the branch line 17.

In the active matrix display apparatus of this example, the common line terminals 5*a*, 5*b* and the branch terminal 16 are used as signal inputs and, therefore, the common main line 6 is divided into two equal parts at the point at which the branch line 17 is branched from the common main line 6. The resistance and capacitance of two equal half portions each of the common main line 6 correspond to one half values of those of a common main line having no such a branch line 17. In the display apparatus of the present example, therefore, the time constant on the common main line 6 is one fourth of that on a common main line having no branch line, a possible signal delay being thus considerably reduced.

EXAMPLE 2

Figure 3:
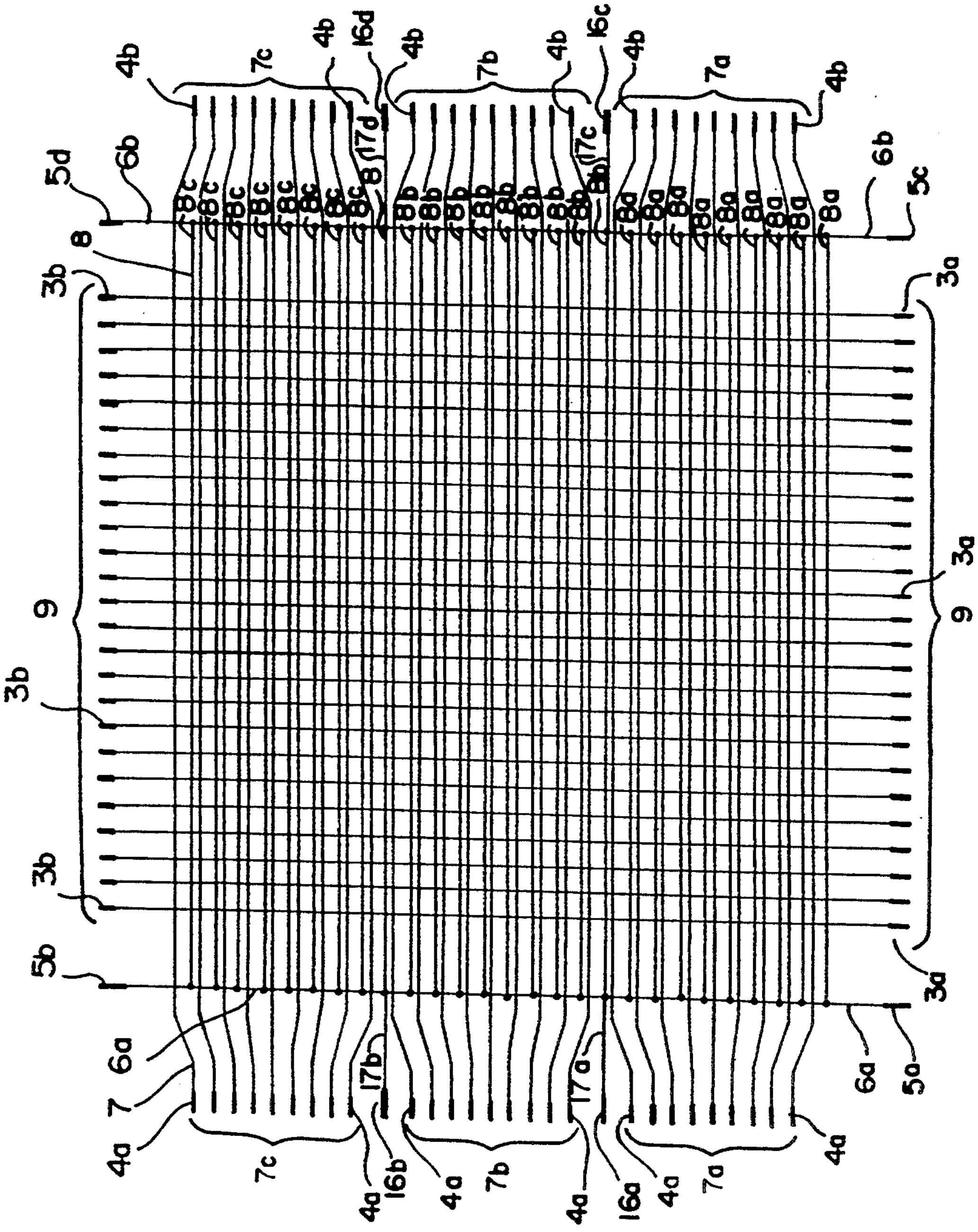
FIG. 3 is a schematic diagram showing another active matrix board employed in the display apparatus of this invention.

Another example of the active matrix board employed in the display apparatus of this invention is shown in FIG. 3. The present example represents a case where the invention is applied to a large-size display apparatus. In this example, the gate bus lines 7 are divided into three blocks of gate bus lines 7*a*, 7*b*, 7*c*. The individual gate bus lines 7*a*, 7*b*, 7*c* each have gate signal terminals 4*a* and 4*b* provided at both ends thereof. At both ends of each source bus line 9 there are provided source signal terminals 3*a* and 3*b*. In this example, therefore, scan signals are applied from both ends of the individual gate bus lines 7*a*, 7*b*, 7*c* and data signals are applied from both ends of the individual source bus lines 9.

In this example, the storage capacitance lines 8 are also divided into three blocks of storage capacity lines 8*a*, 8*b*, 8*c*. Common main lines 6*a* and 6*b* are connected respectively to opposite ends of each storage capacity line 8. In this example, therefore, signals are input from both ends of each storage capacitance line 8. At both ends of the common main lines 6*a* and 6*b* there are provided common line terminals 5*a* and 5*b* and 5*c* and 5*d*.

Branch lines 17*a* and 17*b*, and 17*c* and 17*d* are provided at points at which the respective common main lines 6*a* and 6*b* are divided into three equal parts. At ends of the respective branch lines 17*a*, 17*b*, 17*c*, 17*d* are provided branch terminals 16*a*, 16*b*, 16*c*, 16*d*.

In the active matrix apparatus of the present example, the common line terminals 5*a*, 5*b*, 5*c*, 5*d* and the branch terminals 16*a*, 16*b*, 16*c*, 16*d* are all used as signal inputs. The common main line 6*a* at points at which the branch terminals 16*a* and 16*b* is divided into three equal parts, and accordingly the resistance and capacitance of each of the three equal parts correspond to one third of the resistance and of the capacitance of the entire common main line 6*a*. In the display apparatus of the present example, the time constant on the common main line 6*a* is one ninth of that on a common main line having no branch line 17*a*, 17*b*. Similarly, the time constant on the common main line 6*b* is one ninth of that on a common main line having no branch line 17*c*, 17*d*. Thus, a possible signal delay can be considerably reduced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix display apparatus with reduced signal delay characteristics comprising:

pixel electrodes arranged in a matrix fashion on an insulating substrate and enmeshed by generally orthogonal drive lines including a plurality of storage capacitance lines and a plurality of gate bus lines, said storage capacitance lines connected individually to storage capacitance electrodes, said storage capacitance electrodes arranged opposite to said pixel electrodes, a common main line which is connected to said storage capacitance lines and intersects said plurality of gate bus lines, at least one branch line branched from said common main line with the number of branch lines being sufficient to reduce the time delay of signals to said storage capacitance electrodes opposite to said pixel electrodes, the branch line dividing equally said common main line, and a branch terminal formed at the leading end of said at least one branch line, wherein said common main line is adapted to receive at least three electrically driven signal inputs provided to different locations with equal distances therebetween on said common main line, thereby dividing said common main line into at least two drive line segments, and reducing the time delay for signal inputs to reach pixel electrodes located at positions most remote from the ends of the common main line.

2. An active matrix display apparatus according to claim 1, wherein said common main line is connected to one end of said storage capacitance line.

3. An active matrix display apparatus according to claim 1, wherein said common main line is connected to one end of said storage capacitance lines and further comprising another common main line which is connected to the other end of said storage capacitance lines.

4. An active matrix display apparatus with reduced signal delay characteristics comprising:

pixel electrodes disposed in a matrix on an insulating substrate and enmeshed by generally orthogonal drive lines including plural storage capacitance lines, each of said storage capacitance lines having at least one end connected to a common main line, wherein said common main line is adapted to receive at least three electrically driven signal inputs provided to different locations on said common main line, thereby dividing said common main line into at least two drive line segments, and reducing the effective time delay for signal inputs to reach storage capacitance electrodes opposite to pixel electrodes located at positions most remote from the ends of the common main line.

5. An active matrix display apparatus with reduced signal delay characteristics according to claim 4, wherein said common main line is equally divided into a plurality of drive line segments.

6. An active matrix display apparatus with reduced signal delay characteristics comprising:

pixel electrodes disposed in a matrix on an insulating substrate and enmeshed by generally orthogonal drive lines including plural storage capacitance lines, each of said storage capacitance lines having at least one end connected to a common main line, said drive lines including a plurality of gate bus lines which intersect said common main line, wherein said common main line is adapted to receive at least three electrically driven signal inputs provided to different locations with equal distances therebetween on said common main line, thereby dividing said common main line into at least two drive line segments, and reducing the time delay for signal inputs to reach pixel electrodes located at positions most remote from the ends of the common main line.

* * * * *